United States Patent Office.

WILLIAM JOHN LYND, OF GOLDEN CITY, COLORADO TERRITORY.

Letters Patent No. 92,981, dated July 27, 1869.

IMPROVED METHOD OF EXTRACTING IRON AND OTHER OXIDES FROM CLAY, PORCELAIN-EARTH, &c.

The Schedule referred to in these Letters Patent and making part of the same.

*To whom it may concern:*

Be it known that I, WILLIAM JOHN LYND, of Golden City, in the county of Jefferson, Colorado Territory, have invented certain new and useful Improvements in the Method of and Means for Extracting Iron, Copper, and other Discoloring-Matters from Potters' Clay and other Argillaceous Substances; and I hereby declare the following to be a full, clear, and exact description of the same.

The importance of a cheap and effective process for removing from porcelain and potters' clay the discoloring-matters, which unfit such substances for potters' uses, has long been felt. Owing to the want of some practicable process of this kind, the clays which are found in this country in such abundance, and which, if properly treated, could be manufactured into wares equalling in quality those of foreign make, are practically of little value.

My object, therefore, is to devise a cheap and efficient method of removing the discoloring-matters from such clays as are fitted for pottery uses, and, at the same time, of rendering them better fitted for subsequent manipulation.

In Letters Patent granted me on the 25th May, 1869, I have described and claimed a mode of removing the iron, &c., from the clay by means of magnets or electricity, or both in conjunction. I have discovered, however, that the purification of the clay may be effected by the employment of iron or steel plates not magnetized or affected by electricity, which are immersed or placed in the clay solution, and upon which the iron and other impurities are deposited.

While these plates thus act as effective purifying-agents, electricity may be employed in conjunction with them, but its action is simply to improve the quality of the clay, and not to take the place of the plates in separating the discoloring-matters from the clay.

In carrying my invention into operation, I employ thin iron or steel plates, the number and size of which will depend upon the quantity of the clay to be purified.

A solution of the clay to be acted on is first formed in a bath or other suitable receptacle, and the plates, after the clay has settled, are let down into this solution, being placed close together, say from one-half inch to one inch apart. I prefer to let them down until they touch the clay that has settled, though this is not essential.

The plates are allowed to remain in this position for from twelve to forty-eight hours, after which they are taken out, and will be found to be covered with a deposit of the red and black oxides of iron, sulphate of iron, &c., the red commonly settling on one side of the plates, the black on the other, and the sulphate above them.

The discoloring-matters deposited upon the plates are removed, and unless the clay be already sufficiently purified, the plates are again placed in the solution, this operation being continued until the requisite purification has been attained.

The plates, though five, ten, or twenty feet in height, will receive the forms of iron present in the clay, provided the water reaches that height. In fact there seems to be no limit to the attraction of the iron from the clay on account of the plates, provided the water above the clay covers them.

By changing the clay from one bath to another, and subjecting it to the same action, or by changing the water without changing the baths, the quality of the clay may be improved.

I am thus enabled to purify the clay by the use of these plates, though unmagnetized, and without the aid of electricity. I can, however, use in conjunction with the plates, wires, carrying a current of electricity through the clay solution. Sulphur and some other ingredients can be thus removed, and the clay is acted on beneficially; but, as above stated, this operation is intended to improve the clay, not to separate the iron from the clay.

In order to aid the action of the plates, and expedite the process, electricity may be employed to advantage, by placing the poles of a battery so as to act on all the plates, or the plates may be made electromagnets, by the employment of wires coiled around the top of each, or otherwise arranged, through which a current of electricity should be caused to circulate, the plates when thus acting being immersed in the water above the clay in solution, as hereinbefore specified.

I have found it also advantageous in some instances to employ magnets with the plates, the action of the latter being thus rendered more energetic.

Having now described my invention, and the manner in which the same is or may be carried into effect,

What I claim, and desire to secure by Letters Patent, is—

1. The method of removing iron and other discoloring-maters and impurities from potters' clay, and other argillaceous substances, substantially in the manner and by the means herein described, that is to say, by the employment of unmagnetized plates of iron or steel, immersed or placed in a solution of the clay to be purified, substantially as set forth.

2. The employment, with the unmagnetized iron or steel plates, immersed in the bath of clay to be purified, of electricity, substantially in the manner specified, whereby the action of said plates may be rendered more energetic.

3. The use, in combination with unmagnetized steel plates, whether the action of the same be aided or not by electricity, of artificial or natural permanent magnets, substantially as and for the purposes set forth.

In testimony whereof, I have signed my name to this specification, before two subscribing witnesses.

WM. J. LYND.

Witnesses:
  WILLIAM ARMOR,
  RICHARD H. HARRIS.